United States Patent [19]

Okamoto

[11] Patent Number: 5,112,936
[45] Date of Patent: May 12, 1992

[54] BRANCHED CHAIN STOPPED POLYCARBONATE AND PROCESS FOR PRODUCTION

[75] Inventor: Masaya Okamoto, Ichihara, Japan

[73] Assignee: Idemitsu Petrochemical Co., Ltd., Tokyo, Japan

[21] Appl. No.: 465,212

[22] PCT Filed: Sep. 6, 1989

[86] PCT No.: PCT/JP89/00916
§ 371 Date: Mar. 7, 1990
§ 102(e) Date: Mar. 7, 1990

[87] PCT Pub. No.: WO90/02769
PCT Pub. Date: Mar. 22, 1990

[30] Foreign Application Priority Data

Sep. 6, 1988 [JP] Japan ................... 63-221285

[51] Int. Cl.$^5$ ............................................ C08G 64/14
[52] U.S. Cl. .................................. 528/204; 528/196; 528/370; 528/371
[58] Field of Search ............... 528/204, 196, 370, 371

[56] References Cited

U.S. PATENT DOCUMENTS

| | | | |
|---|---|---|---|
| 3,525,712 | 8/1970 | Kramer | 260/47 |
| 3,544,514 | 12/1970 | Schnell et al. | 260/47 |
| 3,974,126 | 8/1976 | Narita et al. | 260/47 |
| 4,001,184 | 1/1977 | Scott | 260/47 |
| 4,415,723 | 11/1983 | Hedges et al. | 528/204 |
| 4,631,334 | 12/1986 | Masumoto et al. | 528/204 |
| 4,778,936 | 10/1988 | Mizuno et al. | 528/204 |
| 4,894,432 | 1/1990 | Mizune et al. | 528/204 |

*Primary Examiner*—Harold D. Anderson
*Attorney, Agent, or Firm*—Frishauf, Holtz, Goodman & Woodward

[57] ABSTRACT

Branched polycarbonates are disclosed, characterized by having a branched nucleus structure derived from at least one compound of (1) $\alpha$, $\alpha'$, $\alpha''$tris(4-hydroxyphenyl)-1,3,5-triisopropylbenzene, (2) 1-[$\alpha$-methyl-$\alpha$-(4'-hydroxyphenyl)ethyl]-4-[$\alpha'$, $\alpha'$-bis(4''-hydroxyphenyl)ethyl]benzene, (3) phloroglucinol and (4) trimellitic acid, a viscosity average molecular weight of 15,000 to 40,000, and an acetone-soluble matter of not more than 3.5% by weight. A process for efficiently producing these branched polycarbonates is disclosed.

These branched polycarbonates are excellent in impact resistance and are suitable particularly for blow molding.

19 Claims, 1 Drawing Sheet

BRANCHED CHAIN STOPPED POLYCARBONATE AND PROCESS FOR PRODUCTION

TECHNICAL FIELD

The present invention relates to branched polycarbonate and a process for production thereof, and more particularly to branched polycarbonate excellent in impact resistance and suitable for blow molding and a process for production thereof.

BACKGROUND ART

Heretofore, a process for production of polycarbonate using phloroglucinol, trimellitic acid or 1-[α-methyl-α-(4'-hydroxyphenyl)ethyl]-4-[α',α'-bis(4''-hydroxyphenyl)ethyl]benzene as a branching agent has been known, and it is disclosed in, for example, Japanese Patent Publication Nos. 23918/1972, 11733/1985, and Japanese Patent Application Laid-Open No. 146920/1987.

However, polycarbonates produced by the above processes are all insufficient in impact resistance and suffer from various problems in practical use.

DISCLOSURE OF INVENTION

Thus the present inventors made an extensive study to improve impact resistance of polycarbonate obtained by the above conventional processes. In the course of the study, it has been found that in order to improve impact resistance of these branched polycarbonate, it is effective to decrease acetone-soluble matter therein.

An object of the present invention provides polycarbonates excellent in impact resistance.

Another object of the present invention provides polycarbonates suitable for molding, particularly for bow molding.

Another object of the present invention provides a process for efficiently producing the above polycarbonates.

As a result of further investigation from such points of view, it has been found that branched polycarbonates having a branched nucleus structure as derived form a specified compound having at least three functional groups and controlled in an amount of acetone-soluble matter to not more than 3.5% can solve the above subjects, and that the desired branched polycarbonates can be efficiently produced by first reacting in a turbulent flow condition a reaction mixture containing a compound having at least three functional groups as a starting material component, and then adding an aqueous alkali solution and continuing the reaction in a laminar flow condition.

The present invention has been completed based on the above findings.

That is, the present invention provides branched polycarbonates characterized by having a branched nucleus structure as derived form at least one compound of (1) α,α',α''-tris(4-hydroxyphenyl)-1,3,5-triisopropylbenzene, (2) 1-[α-methyl-α-(4'-hydroxyphenyl)ethyl-4-[α',α'-bis(4''-hydroxyphenyl)-ethyl benzene, (3) phloroglucinol and (4) trimellitic acid, having a viscosity average molecular weight of 15,000 to 40,000, and having an acetone-soluble matter of not more than 3.5% by weight.

BEST MODE FOR CARRYING OUT THE INVENTION

Figure 1:
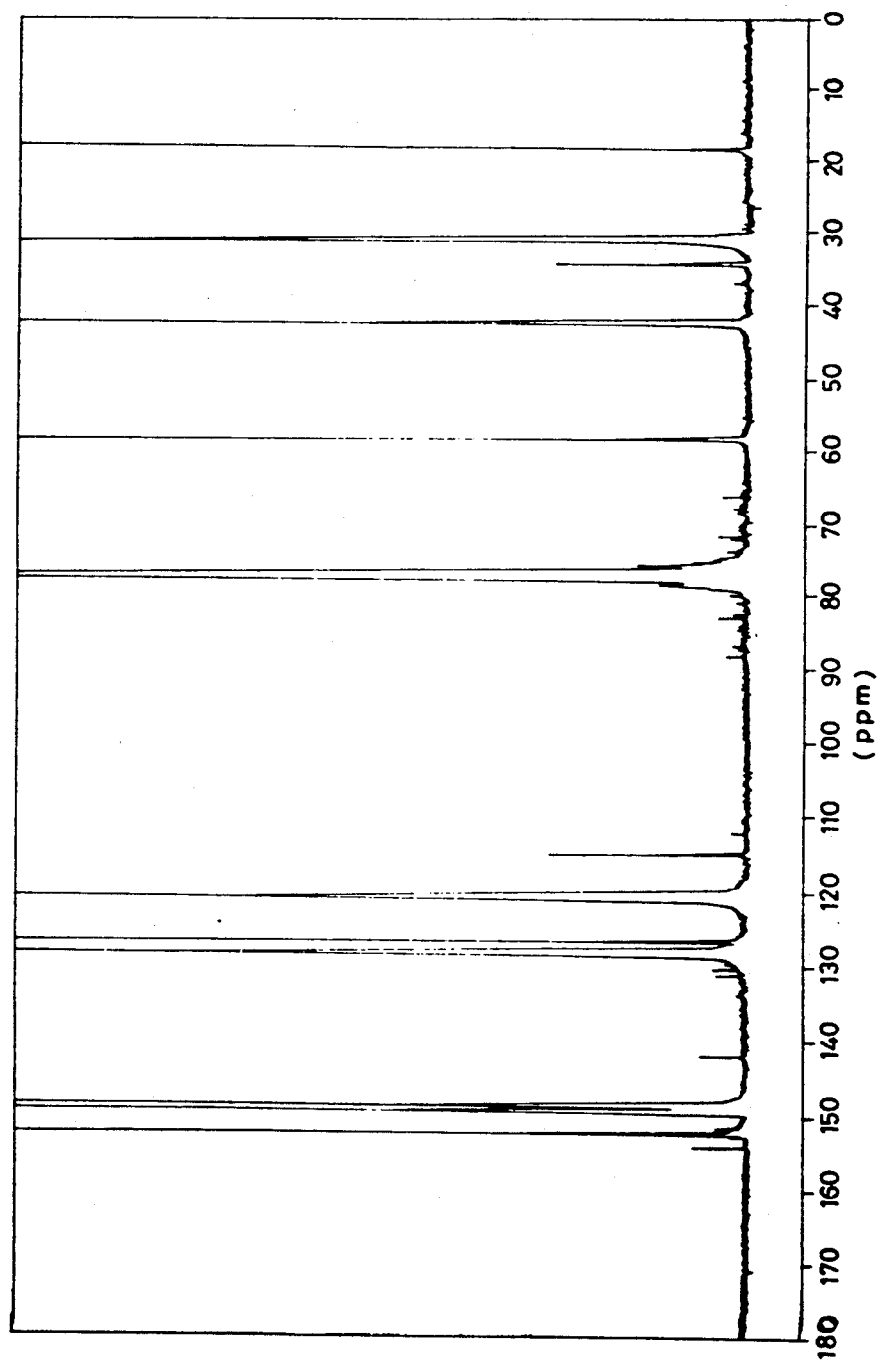
FIG. 1 is a nuclear magnetic resonance (NMR) spectrum of the branched polycarbonate obtained in Example 1.

The branched polycarbonates of the present invention have, as described above, a branched nucleus structure derived from one or two or more compounds of (1) to (4). A poly-carbonate having a branched nucleus structure derived from (1) α,α',α''-tris(4-hydroxyphenyl)-1,3,5-triisopropylbenzene is a polycarbonate represented by the formula:

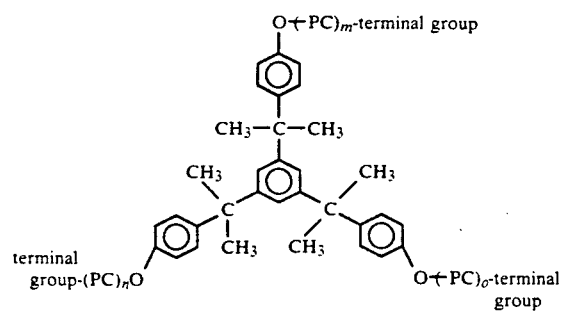

(wherein PC represents a polycarbonate chain, and m, n and o represent integers). When, in production of the above polycarbonate chain, bisphenol A, for example, is used, PC in the above formula is represented by the formula:

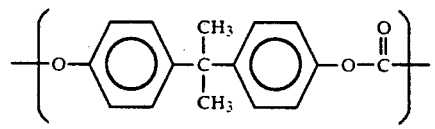

A polycarbonate of the present invention, having a branched nucleus structure derived from (2) 1-[α-methyl-α-(4'-hydroxyphenyl)ethyl]-4-[α',α'-bis(4''-hydroxyphenyl)ethyl]benzene is represented by the following formula:

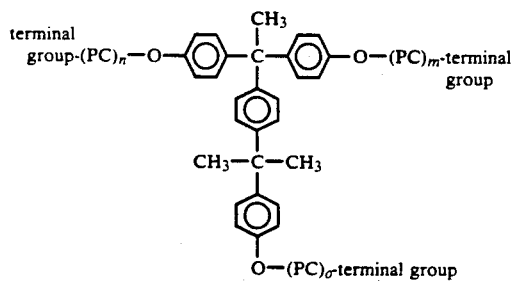

(wherein PC, m, n and o are the same as described above).

Moreover, a polycarbonate of the present invention, having a branched nucleus structure derived from (3) fluoroglycine, when indicated in a concrete manner, is represented by the following formula:

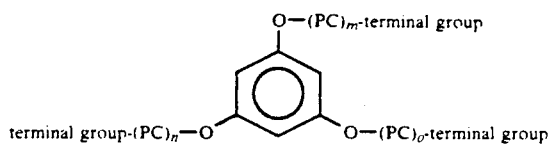

(wherein PC, m, n and o are the same as described above).

A polycarbonate of the present invention, having a branched nucleus structure derived from (4) trimellitic acid, when indicated in a concrete manner, is represented by the following formula:

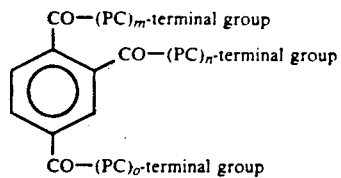

(wherein PC, m, n and o are the same as described above).

The polycarbonates of the present invention have the specified branched nucleus structure as described above and at the same time, have a viscosity average molecular weight of 15,000 to 40,000. If the viscosity average molecular weight is less than 15,000, impact resistance is decreased while on the other hand if it is in excess of 40,000, moldability is reduced.

Moreover, the polycarbonates of the present invention are such that the acetone-soluble matter is not more than 3.5% by weight. If the acetone-soluble matter is in excess of 3.5% by weight, impact resistance is markedly decreased. The acetone-soluble matter as used herein refers to a component extracted from the objective polycarbonate in Soxhlet extraction using acetone as a solvent.

The present invention further provides a process for producing branched polycarbonates (hereinafter referred to as Process A) which is characterized in that (i) a polycarbonate oligomer derived from aromatic dihydric phenols, compounds having at least three functional groups, and phosgene, (ii) aromatic dihydric phenols, and (iii) a terminal stopper are reacted while stirring so that a reaction mixture containing them is in a turbulent flow, and at the point that the viscosity of the reaction mixture increases, aqueous alkali solution is added thereto and at the same time, the resulting reaction mixture is reacted in laminar flow.

In this Process A, as described above, a polycarbonate oligomer derived from aromatic dihydric phenols, compounds having at least three functional groups, and phosgene is used. As aromatic dihydric phenols to be used for producing the polycarbonate oligomer, various ones can be given; for example, various bisphenols can be used. As bisphenols, concretely, bisphenol A; 1,1-bis(4-hydroxyphenyl)ethane; 1,1-bis(4-hydroxyphenyl)butane; 1,1-bis(4-hydroxyphenyl)isobutane; 1,1-bis(4-hydroxyphenyl)cyclohexane; 2,2-bis(4-hydroxyphenyl)propane; 2,2-bis(4-hydroxyphenyl)butane and the like can be listed.

As the compounds having at least three functional groups, those having, in one compound, three or more of functional groups such as a hydroxyl group, a carboxyl group, an amino group, an imino group, a formyl group, an acid phloroglucinol, mellitic acid, trimellitic acid, trimellitic acid chloride, trimellitic anhydride, gallic acid, n-propyl gallate, proto-catechuic acid, pyromellitic acid, pyromellitic dianhydride, α-resorcyclic acid, β-resorcyclic acid, resorcinaldehyde, trimethyl chloride, trimethyltrichloride, 4-chloroformylphthalic anhydride, benzophenonetetracarboxylic acid; 4,6-dimethyl-2,4,6-tri(4'-hydroxyphenyl)-heptene-2; 4,6-dimethyl-2,4,6-tri(4'-hydroxyphenyl)-heptane-2; 1,3,5-tri-(4'-hydroxyphenyl)benzene; 1,1,1-tri(4'-hydroxyphenyl)-ethane; 2,2-bis[4,4-bis(4'-hydroxyphenyl)cyclohexyl]-propane; 2,6-bis(2'-hydroxy-5'-methylbenzyl)-4-methylphenol; 2,6-bis(2'-hydroxy-5 '-isopropylbenzyl)-4-isopropylphenol; bis[2-hydroxy-3-(2'-hydroxy-5'-methylbenzyl)-5-methylphenyl]methane; tetra(4-hydroxyphenyl)methane; tri(4-hydroxyphenyl)-phenylmethane; tris(4'-hydroxyaryl)-amyl-s-triazine; α,α',α"-tris(4-hydroxyphenyl)-1,3,5-triisopropylbenzene; 1-[α-methyl-α-(4'-hydroxyphenyl)ethyl]benzene; 1-[α-methyl-α-(4'-hydroxyphenyl)ethyl]-3-[α',α'-bis(4"-hydroxyphenyl)ethyl]benzene and the like can be given.

The polycarbonate oligomer to be used in the Process A of the present invention is obtained by reacting aromatic dihydric phenols, compounds having at least three functional groups and phosgene as described above by the known method. The polycarbonate ligomer thus prepared and aromatic dihydric phenols (which may be the same as described above) are used as starting materials for polymerization, and a terminal stopper is added to the reaction system and further, if desired, an organic solvent such as methylene chloride, chloroform, chlorobenzene, carbon tetrachloride and the like and a catalyst such as tertiary amine (triethylamine, etc.) are added to prepare a reaction mixture. In this case, it is preferred that aromatic dihydric phenols be added to the reaction system as an aqueous solution of caustic alkali such as sodium hydroxide and potassium hydroxide.

As the terminal stopper, various ones can be used, and for example, p-tert-butylphenol, phenol, p-cumylphenol, p-tert-octylphenol and the like can be given and from a stand-point of impact resistance at low temperatures, p-cumylphenol and p-tert-octylphenol are preferred.

In the Process A, a reaction mixture containing these components are first reacted while stirring so that it is in a turbulent flow. For stirring to be conducted at this stage, it suffices that the reaction proceeds in the state that the reaction mixture is in the turbulent condition. Although the rate of stirring is not critical, it usually suffices that stirring is carried out at not less than 400 rpm. Although the reaction time varies with various circumstances, it generally suffices that the reaction is carried out at the above rate of stirring for at least one minute.

In the Process A of the present invention, the reaction in this turbulent condition is continued until the viscosity of the reaction mixture increases. At the point that the viscosity increases, an aqueous alkali solution (sodium hydroxide, potassium hydroxide, etc.) is added and at the same time, stirring conditions are changed so as to convert the reaction mixture from in the turbulent flow to in the laminar flow, and the reaction is continued. Although stirring conditions to convert the flow of the reaction mixture into a laminar flow cannot be determined unconditionally because they are influenced by a viscosity of the reaction mixture, it is generally sufficient to employ a rate of stirring of not more than 300 rpm. Also, although the reaction time varies with various circumstances, it is generally sufficient to conduct the reaction for 30 minutes to 2 hours at the above rate of stirring.

In the Process A of the present invention, although a measure of converting the reaction mixture from in a turbulent flow to in a laminar flow is set at the point that the viscosity of the reaction mixture increases, this increase in viscosity cannot be necessarily numerically specified. Accordingly, choosing the converting point is sufficiently carried out by observing a change in the viscous property of the reaction mixture with the eye, and the determination of the point of converting into a laminar flow by visual observation can be carried out relatively easily.

In the Process A of the present invention, the polymerization reaction proceeds in the scheme as described above, and the proportion of each component compounded at each reaction stage is preferably determined in the following range. That is, assuming that the number of moles of the aromatic dihydric phenol in production of polycarbonate oligomer is h, the number of moles of the compound having at least three functional groups is i, the number of moles of the chloroformate group of the polycarbonate oligomer is j, the number of moles of the terminal stopper is k, the number of moles of the aromatic dihydric phenol at the time of polycondensation is l, the number of moles of caustic alkali of the aqueous alkali solution dissolving therein the aromatic dihydric phenol is m, the number of moles of caustic alkali of the aqueous alkali solution to be added at the time of converting from a turbulent flow into a laminar flow is n, and the number of moles of the tertiary amine as a catalyst is o, each component is compounded within the ranges that $0.5\times 10^{-2} < i/h < 2.5\times 10^{-2}$, $0.04 < k/j < 0.17$, $0.40 < l/j < 0.55$, $2.02 < m/l < 2.50$, $1.40 < (m+l)/j < 1.60$, and $1.0\times 1.0^{-3} < o/j < 5.0\times 10^{-3}$. If i/h is not more than $0.5\times 10^{-2}$, blow molding characteristics are not improved, and if it is not less than $2.5\times 10^{-2}$, geling undesirably occurs. If k/j is not more than 0.04, viscosity undesirably increases, and if it is not less than 0.17, the strength of polycarbonate is insufficient. Moreover, if l/j is not more than 0.40, the strength of polycarbonate is insufficient, and conversely if it is not less than 0.55, unreacted aromatic dihydric phenol is increased, which is not desirable. If m/l is not more than 2.02, the aromatic dihydric phenol is not dissolved, and if it is not less than 2.50, decomposition of the chloroformate group occurs. In connection with (m+l)/j, if it is not more than 1.40, the strength of polycarbonate is insufficient, and if it is not less than 1.60, decomposition of the chloroformate group occurs. Moreover, if o/j is not more than $1.0\times 1.0^{-3}$, the rate of reaction becomes low, and if it is not less than $5.0\times 10^{-3}$, a problem arises in that decomposition of the chloroformate group increases.

In the above Process A, a polycarbonate oligomer in which a compound having at least three functional groups has been incorporated is used, and it is also possible that a polycarbonate oligomer is previously prepared from aromatic dihydric phenols and phosgene, and a compound having at least three functional groups is added thereto and reacted.

That is, the present invention further relates to a process for producing branched polycarbonates (hereinafter referred to Process B) which is characterized in that (i) a polycarbonate oligomer derived from aromatic dihydric phenols and phosgene, (ii) aromatic dihydric phenols, (iii) compounds having at least three functional groups, and (iv) a terminal stopper are reacted while stirring in such a manner that the reaction mixture is in a turbulent flow, and at the point that the viscosity of the reaction mixture increases, an aqueous alkali solution is added and at the same time, the reaction mixture is reacted in a laminar flow.

In connection with stirring conditions in the practice of the Process B, conversion of the turbulent flow into the laminar flow, and so on, they are the same as in the above Process A.

In the Process B of the present invention, the proportion of each component compounded at each reaction stage is preferably chosen within the following range. That is, assuming that the number of moles of the chloroformate group of polycarbonate oligomer is a, the number of moles of the terminal stopper is b, the number of moles of aromatic dihydric phenols is c, the number of moles of caustic alkali of an aqueous alkali solution with the aromatic dihydric phenol dissolved therein is d, the number of moles of caustic soda of an aqueous alkali solution to be added at the point of converting from a turbulent flow into a laminar flow is e, the number of moles of tertiary amine as a catalyst is f, and the number of moles of a compound having at least three functional groups is g, each component is compounded in the range that $0.04 < b/a < 0.17$, $0.40 < c/a < 0.55$, $2.02 < d/c < 2.50$, $1.40 < (d+e)/a < 1.60$, $1.0\times 10^{-3} < f/a < 5.0\times 10^{-3}$, $1.0\times 10^{-2} < g/a < 10^{-2}$. If b/a is not more than 0.04, the viscosity is undesirably increased, and if it is not less than 0.17, the strength of the polycarbonate obtained is insufficient. If c/a is not more than 0.40, the molecular weight is increased insufficiently and conversely if it is not less than 0.55, unreacted aromatic dihydric phenols become excessive. Both cases are not desirable. Moreover, if d/c is not more than 2.02, the aromatic dihydric phenols are not dissolved, and if it is not less than 2.50, decomposition of the chloroformate group occurs. In connection with (d+e)/a, if it is not more than 1.40, the molecular weight is not sufficiently increased, and if it is not less than 1.60, decomposition of the chloroformate group occurs frequently. In connection with the value of f/a, if it is not more than $1.0\times 1.0^{-3}$, the rate of reaction is low, and if it is not less than $5.0\times 10^{-3}$, a problem arises in that decomposition of the chloroformate increases. Moreover, if g/a is not more than $1.0\times 1.0^{-2}$, blow molding characteristics are not improved, and if it is not less than $4.5\times 10^{-2}$, geling undesirably occurs.

Next, the present invention is explained in greater detail with reference to the following examples and comparative examples.

PREPARATION EXAMPLE (1) Synthesis of Polycarbonate Oligomer A 60 kg of bisphenol A was dissolved in 400L (L=liter) of a 5% aqueous sodium hydroxide solution to prepare an aqueous sodium hydroxide solution of bisphenol A.

Then, the aqueous sodium hydroxide solution of bisphenol A maintained at room temperature was introduced into a tubular reactor with an inner diameter of 10 mm and tube length of 10 m through an orifice plate at a flow rate of 138 L/hr, and methylene chloride was introduced therein at a flow rate of 69 L/hr, and phosgene was blown thereinto in parallel at a flow rate of 10.7 kg/hr to continuously react them for 3 hours. The tubular reactor as used herein was a double tube, and the discharge temperature of the reaction solution was maintained at 25° C. by passing cooling water in the jacket section.

The pH of the discharge liquid was adjusted to indicate 10 to 11. By allowing the reaction solution thus obtained to stand, an aqueous layer was separated and removed, and a methylene chloride layer (220 L) was recovered. To this was added 170L of methylene chloride, which was thoroughly stirred and used as a polycarbonate oligomer A (concentration 317 g/L). The degree of polymerization of the polycarbonate oligomer thus obtained was 3 to 4.

(2) Synthesis of Polycarbonate Oligomer B 60 kg of bisphenol A and 0.48 kg of fluoroglycine were dissolved in 400L of a 5% aqueous sodium hydroxide solution to prepare an aqueous solution.

Thereafter, in the same manner as in (1) above, a polycarbonate oligomer B was obtained. The concentration was 318 g/L.

(3) Synthesis of Polycarbonate Oligomer C 60 kg of bisphenol A and 0.8 kg of trimellitic acid were dissolved in 400L of a 5% aqueous sodium hydroxide solution to prepare an aqueous solution.

Thereafter, in the same manner as in (1) above, a polycarbonate oligomer C was obtained. The concentration was 319 g/L.

(4) Synthesis of Polycarbonate Oligomer D 60 kg of bisphenol A and 1.83 kg of $\alpha,\alpha',\alpha''$-tris(4-hydroxyphenyl)-1,3,5-triisopropylbenzene were dissolved in 400L of a 5% aqueous sodium hydroxide solution to prepare an aqueous solution.

Thereafter, in the same manner as in (1) above, a polycarbonate oligomer D was obtained. The concentration was 321 g/L.

(5) Synthesis of Polycarbonate Oligomer E 60 kg of bisphenol A and 1.68 kg of 1-[$\alpha$-methyl-$\alpha$-(4'-hydroxyphenyl)ethyl]-4-[$\alpha',\alpha'$bis(4''-hydroxyphenyl)ethyl]benzene were dissolved in 400L of a 5% aqueous sodium hydroxide solution to prepare an aqueous solution.

Thereafter, in the same manner as in (1) above, a polycarbonate oligomer E was obtained. The concentration was 320 g/L.

EXAMPLE 1

3.34L of methylene chloride was added to 5.66L of the polycarbonate oligomer B to prepare a solution $I_1$.

Separately, 173.4 g of sodium hydroxide and 482.9 g of bisphenol A were dissolved in 2.9L of water to prepare a solution $II_1$.

The above solution $I_1$ and solution $II_1$ were mixed, 0.856 g of triethylamine as a catalyst and 45.5 g of p-tertbutylphenol as a terminal stopper were added, and they were stirred in a turbulent condition for 10 minutes at 600 rpm.

Thereafter, 167 ml of an aqueous sodium hydroxide solution (concentration 48% by weight) was added, and the reaction was carried out by stirring in a laminar condition for 60 minutes at 200 rpm.

After the reaction, 5L of water and 5L of methylene chloride were added, the mixture was separated into a methylene chloride layer and an aqueous layer, and the methylene chloride layer was subjected to alkali washing using a 0.01N aqueous sodium hydroxide solution and further to acid washing using 0.1N hydrochloric acid.

Then, water washing was applied to remove the methylene chloride to obtain polycarbonate which was a polymer in a flake form. The acetone-soluble matter of the flake-formed polymer thus obtained was measured by Soxhlet extraction over 8 hours.

Then, the flake-formed polymer obtained was granulated by passing through an extruder at 220° to 270° C.

The pellets obtained were injection molded and an Izod impact strength was measured. Moreover, using the pellets obtained, the melt index ratio and the swell ratio were measured. The results are shown in Table 1. A nuclear magnetic resonance ($^{13}$C-NMR) spectrum (solvent: heavy chloroform, standard material: tetramethylsilane) of the polycarbonate obtained is shown in FIG. 1.

EXAMPLE 2

To 5.64L of the polycarbonate oligomer C was added 3.36L of methylene chloride to prepare a solution $I_2$.

In connection with the others, the same operation as in Example 1 was conducted. The results are shown in Table 1.

EXAMPLE 3

To 5.61L of the polycarbonate oligomer D was added 3.39L of methylene chloride to prepare a solution $I_3$.

In connection with the others, the same operation as in Example 1 was conducted. The results are shown in Table 1.

EXAMPLE 4

To 5.62L of the polycarbonate oligomer E was added 3.38 L of methylene chloride to prepare a solution $I_4$.

In connection with the others, the same operation as in Example 1 was conducted. The results are shown in Table 1.

EXAMPLE 5

To 5.68L of the polycarbonate oligomer A was added 3.32 L of methylene chloride to prepare a solution $I_5$.

The above solution $I_5$ and the solution $II_1$ used in Example 1 were mixed, 0.856 g of triethylamine as a catalyst, 45.5 g of p-tert-butylphenol as a terminal stopper and 14.4 g of phloroglucinol as a branching agent were added, and they were stirred in a turbulent condition for 10 minutes at 600 rpm.

Then, 167 ml of an aqueous sodium hydroxide solution (concentration 48% by weight) was added, and the reaction was conducted by stirring in a laminar condition for 60 minutes at 200 rpm.

After the reaction, 5L of water and 5L of methylene chloride were added, a methylene chloride layer and an aqueous layer were separated, and the ethylene chloride layer was subjected to alkali washing using a 0.01N aqueous sodium hydroxide solution and then to acid washing using 0.1N hydrochloric acid.

Then, water washing was applied to separate the methylene chloride, and a polymer in a flake form was obtained.

The following operation was conducted in the same manner as in Example 1. The results are shown in Table 1.

EXAMPLE 6

The same operation as in Example 5 was conducted with the exception that 24 g of trimellitic acid was used in place of 14.4 g of phloroglucinol. The results are shown in Table 1.

EXAMPLE 7

The same operation as in Example 5 was conducted with the exception that 54.9 g of $\alpha,\alpha',\alpha''$-tris(4-hydroxyphenyl)-1,3,5-triisopropylbenzene was used in place of 14.4 g of phloroglucinol. The results are shown in Table 1.

EXAMPLE 8

The same operation as in Example 5 was conducted with the exception that 50.3 g of 1-[$\alpha$-methyl-$\alpha$-(4'-hydroxyphenyl)ethyl]-4-[$\alpha',\alpha'$-bis(4''-hydroxyphenyl)ethyl]benzene was used in place of 14.4 g of phloroglucinol. The results are shown in Table 1.

EXAMPLE 9

The same operation as in Example 1 was conducted with the exception that 64.3 g of p-cumylphenol was used in place of 45.5 g of p-tert-butylphenol. The results are shown in Table 1.

EXAMPLE 10

The same operation as in Example 1 was conducted with the exception that 62.5 g of p-tert-octylphenol was used in place of 45.5 g of p-tert-butylphenol. The results are shown in Table 1.

EXAMPLE 11

The same operation as in Example 1 was conducted with the exception that the solution $I_3$ was used in place of the solution $I_1$ and 64.3 g of p-cumylphenol was used in place of 45.5 g of p-tert-butylphenol. The results are shown in Table 1.

EXAMPLE 12

The same operation as in Example 1 was conducted with the exception that the solution $I_3$ was used in place of the solution $I_1$ and 62.5 g of p-octylphenol was used in place of 45.5 g of p-tert-butylphenol. The results are shown in Table 1.

EXAMPLE 13

The same operation as in Example 1 was conducted with exception that the solution $I_4$ was used in place of the solution $I_1$ and 64.3 g of p-cumylphenol was used in place of 45.5 g of p-tert-butylphenol. The results are shown in Table 1.

EXAMPLE 14

The same operation as in Example 1 was conducted with the exception that the solution $I_4$ was used in place of the solution $I_1$ and 62.5 g of p-octylphenol was used in place of 45.5 g of p-tert-butylphenol. The results are shown in Table 1.

EXAMPLE 15

The same operation as in Example 1 was conducted with the exception that 64.3 g of p-cumylphenol was used in place of 45.5 g of p-tert-butylphenol. The results are shown in Table 1.

EXAMPLE 16

The same operation as in Example 5 was conducted with the exception that 24 g of trimellitic acid was used in place of 14.4 g of phloroglucinol, and 64.3 g of p-cumylphenol was used in place of 45.5 g of p-tert-butylphenol. The results are shown in Table 1.

EXAMPLE 17

The same operation as in Example 5 was conducted with the exception that 54.9 g of $\alpha,\alpha',\alpha''$-tris(4-hydroxyphenyl)-1,3,5-triisopropylbenzene was used in place of 14.4 g of phloroglucinol, and 64.3 g of p-cumylphenol was used in place of 45.5 g of p-tert-butylphenol. The results are shown in Table 1.

EXAMPLE 18

The same operation as in Example 5 was conducted with the exception that 54.9 g of $\alpha,\alpha',\alpha''$-tris(4-hydroxyphenyl)-1,3,5-triisopropylbenzene was used in place of 14.4 g of phloroglucinol, and 62.5 g of p-tert-octylphenol was used in place of 45.5 g of p-tert-butylphenol. The results are shown in Table 1.

EXAMPLE 19

The same operation as in Example 5 was conducted with the exception that 50.3 g of 1-[$\alpha$-methyl-$\alpha$-(4'-hydroxyphenyl)ethyl]-4-[$\alpha',\alpha'$-bis(4''-hydroxyphenyl)ethyl]benzene was used in place of 14.4 g of fluoroglycine, and 64.3 g of p-cumylphenol was used in place of 45.5 g of p-tert-butylphenol. The results are shown in Table 1.

EXAMPLE 20

The same operation as in Example 5 was conducted with the exception that 50.3 g of 1-[$\alpha$-methyl-$\alpha$-(4'-hydroxyphenyl)ethyl]-4-[$\alpha',\alpha'$-bis(4''-hydroxyphenyl)ethyl]benzene was used in place of 14.4 g of phloroglucinol, and 62.5 g of p-tert-octylphenol was used in place of 45.5 g of p-tert-butylphenol. The results are shown in Table 1.

EXAMPLE 21

The same operation as in Example 1 was conducted with the exception that 75.2 g of p-cumylphenol was used in place of 45.5 g of p-tert-butylphenol. The results are shown in Table 1.

EXAMPLE 22

The same operation as in Example 1 was conducted with the exception that 53.2 g of p-cumylphenol was used in place of 45.5 g of p-tert-butylphenol. The results are shown in Table 1.

COMPARATIVE EXAMPLE 1

294 g of sodium hydroxide and 483 g of bisphenol A were dissolved in 3.3L of water to prepare a solution $II_2$. The solution $I_5$ used in Example 5 and the above solution $II_2$ were mixed, 0.856 g of triethylamine as a catalyst, 45,5 g of p-tert-butylphenol as a terminal stopper and 14.4 g of phloroglucinol as a branching agent were added, and they were stirred at 500 rpm for 60 minutes.

After the reaction, 5L of water and 5L of methylene chloride were added, an ethylene chloride layer and an aqueous layer were separated, and the ethylene chloride layer was subjected to alkali washing using a 0.01N aqueous sodium hydroxide solution and then to acid washing using 0.1N hydrochloric acid.

Then, water washing was applied to remove the methylene chloride, and polycarbonate was obtained which was a polymer in a flake form.

The following operation was carried out in the same manner as in Example 1. The results are shown in Table 1.

COMPARATIVE EXAMPLE 2

220 g of distilled water, 110 g of bisphenol A, 1 g of triethylamine, 0.7 g of trimellitic acid, and 1.5 g of phenol were dispersed in 700 ml of dichloromethane.

Then, to the above dispersion, phosgene was added at about 1 g/min for about 20 minutes, then at about 2.2 g/min for about 20 minutes, and finally at about 1.3 g/min for about 20 minutes. During the addition of phosgene, the pH was maintained at 4–6 during the initial 20 minutes and, thereafter, adjusted to 10.5–11.5. In this case, the pH was adjusted by adding a 25% by weight aqueous sodium hydroxide solution.

After the reaction, the organic layer was separated, and was subjected to alkali washing using a 0.01N aqueous sodium hydroxide solution and then to acid washing using 0.1N hydrochloric acid. Then, water washing was applied to remove the methylene chloride, and polycarbonate was obtained which was a polymer in a flake form.

The following operation was carried out in the same manner as in Example 1. The results are shown in Table 1.

COMPARATIVE EXAMPLE 3

The solution $I_1$ used in Example 1 and the solution $II_2$ used in Comparative Example 1 were mixed, 0.856 g of triethylamine as a catalyst and 45.5 g of p-tert-butylphenol as a terminal stopper were added, and they were stirred at 500 rpm for 60 minutes.

After the reaction, the same operation as in Comparative Example 1 was conducted. The results are shown in Table 1.

COMPARATIVE EXAMPLE 4

The same operation as in Comparative Example 1 was carried out with the exception that the amount of p-tert-butylphenol used was changed from 45.5 g to 51.3 g. The results are shown in Table 1.

COMPARATIVE EXAMPLE 5

The same operation as in Comparative Example 1 was carried out with the exception that the amount of p-tert-butylphenol used was changed from 45.5 g to 37.6 g. The results are shown in Table 1.

TABLE 1

| No. | Acetone[1] Soluble Matter (wt %) | MIR[2] | Swell[3] Ratio | Izod Impact Strength[4] | | | | $Mv$[5] |
|---|---|---|---|---|---|---|---|---|
| | | | | −10° C. | −15° C. | −20° C. | −25° C. | |
| Example 1 | 2.0 | 71 | 2.32 | 10 | 9 | 5 | 2 | $2.1 \times 10^4$ |
| Example 2 | 2.4 | 73 | 2.61 | 10 | 8 | 4 | 1 | $2.1 \times 10^4$ |
| Example 3 | 2.3 | 62 | 2.42 | 10 | 8 | 3 | 1 | $2.2 \times 10^4$ |
| Example 4 | 2.1 | 65 | 2.19 | 10 | 8 | 3 | 0 | $2.1 \times 10^4$ |
| Example 5 | 1.9 | 67 | 2.86 | 10 | 9 | 5 | 3 | $2.1 \times 10^4$ |
| Example 6 | 1.9 | 68 | 2.45 | 10 | 9 | 4 | 2 | $2.1 \times 10^4$ |
| Example 7 | 2.0 | 72 | 2.75 | 10 | 7 | 3 | 1 | $2.2 \times 10^4$ |
| Example 8 | 2.0 | 74 | 2.26 | 10 | 9 | 5 | 2 | $2.2 \times 10^4$ |
| Example 9 | 2.1 | 75 | 2.85 | 10 | 10 | 9 | 5 | $2.1 \times 10^4$ |
| Example 10 | 2.5 | 69 | 2.24 | 10 | 10 | 7 | 4 | $2.1 \times 10^4$ |
| Example 11 | 2.4 | 72 | 2.56 | 10 | 10 | 8 | 5 | $2.2 \times 10^4$ |
| Example 12 | 2.4 | 64 | 2.34 | 10 | 10 | 8 | 4 | $2.1 \times 10^4$ |
| Example 13 | 2.6 | 70 | 2.75 | 10 | 10 | 8 | 5 | $2.1 \times 10^4$ |
| Example 14 | 2.0 | 72 | 2.22 | 10 | 10 | 7 | 4 | $2.1 \times 10^4$ |
| Example 15 | 2.4 | 69 | 2.66 | 10 | 10 | 9 | 6 | $2.1 \times 10^4$ |
| Example 16 | 2.1 | 64 | 2.45 | 10 | 10 | 8 | 5 | $2.1 \times 10^4$ |
| Example 17 | 2.4 | 69 | 2.88 | 10 | 10 | 8 | 5 | $2.1 \times 10^4$ |
| Example 18 | 2.2 | 71 | 2.54 | 10 | 10 | 8 | 4 | $2.2 \times 10^4$ |
| Example 19 | 2.3 | 70 | 2.32 | 10 | 10 | 9 | 5 | $2.2 \times 10^4$ |
| Example 20 | 2.3 | 65 | 2.44 | 10 | 10 | 7 | 4 | $2.1 \times 10^4$ |
| Comparative Example 1 | 3.7 | 60 | 2.31 | 8 | 5 | 1 | 0 | $2.1 \times 10^4$ |
| Comparative Example 2 | 3.9 | 68 | 2.64 | 9 | 6 | 1 | 0 | $2.8 \times 10^4$ |
| Comparative Example 3 | 3.8 | 35 | 1.12 | 10 | 6 | 2 | 0 | $2.6 \times 10^4$ |
| Example 21 | 2.6 | 69 | 2.68 | 10 | 8 | 3 | 0 | $1.7 \times 10^4$ |
| Example 22 | 1.9 | 71 | 2.72 | 10 | 10 | 10 | 7 | $2.7 \times 10^4$ |
| Comparative Example 4 | 3.9 | 60 | 2.59 | 6 | 2 | 0 | 0 | $1.7 \times 10^4$ |
| Comparative | 3.7 | 65 | 2.66 | 10 | 8 | 4 | 0 | $2.7 \times 10^4$ |

TABLE 1-continued

| No. | Acetone*1 Soluble Matter (wt %) | MIR*2 | Swell*3 Ratio | Izod Impact Strength*4 | | | | Mv*5 |
|---|---|---|---|---|---|---|---|---|
| | | | | −10° C. | −15° C. | −20° C. | −25° C. | |
| Example 5 | | | | | | | | |

*1Acetone-soluble matter
This is component extracted in Soxhlet using acetone as a solvent. That is, 15 g of a material obtained by grinding a sample of polycarbonate and passing through a 100 mesh metal net was placed on a cylindrical filter paper No. 84 (28 × 100 mm) and extracted with 300 ml of acetone by refluxing for 8 hours at a reflux amount of once (20 ml/once) per 3 to 4 minutes. Then, a residue after evaporation of 300 ml of acetone was measured and was referred to as the acetone-soluble matter.
*2MIR
Melt index ratio (MI$_{11\,kg}$/MI$_{325\,g}$) measured at 280° C.
*3Swell ration
Value obtained by dividing a cross-sectional area of a strand extruded when a load of 11 kg is applied to a molten resin in measurement of melt index, by a cross-sectional area of an orifice.
*4Izod impact resistance measured according to JIS-K-7110. That is, an Izod impact test of 10 samples was conducted and the number of samples undergone ductile fracture was indicated. The others underwent brittle fracture. The samples were notched and had a thickness of 3 mm. Measurement was conducted under a weight of 2.75 J.
*5Viscosity average molecular weight
Calculated from a viscosity of a methylene chloride solution measured at 20° C. in a Ubbellohde viscometer.

Calculated from a viscosity of amethylene chloride solution measured at 20° C. in a Ubbellohde viscometer.

INDUSTRIAL APPLICABILITY

As described above, in accordance with the present invention, new branched polycarbonates excellent in impact resistance are obtained, and these branched polycarbonates are suitable for blow molding. Accordingly, a blow molding obtained using the polycarbonates as a raw material is markedly increased in impact resistance as compared with the conventional ones.

Moreover, in accordance with the process of the present invention, the above branched polycarbonates can be efficiently produced, and the polycarbonates obtained are of high quality.

Therefore, the branched polycarbonates of the present invention can be effectively utilized as raw materials for various moldings, particularly blow moldings.

I claim:

1. A branched polycarbonate comprising a branched nucleus structure which is derived from at least one compound selected from the group consisting of (a) α,α′, α″-tris(4-hydroxyphenyl)-1,3,5-triisopropylbenzene of the formula

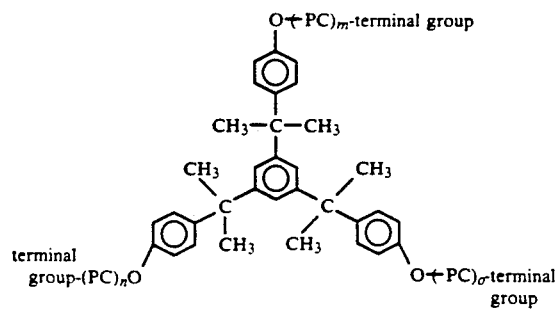

(b) 1-{α-methyl-α-(4′-hydroxy-phenyl)ethyl}-4-{α′,α′-bis(4″-hydroxyphenyl)-ethyl}benzene of the formula

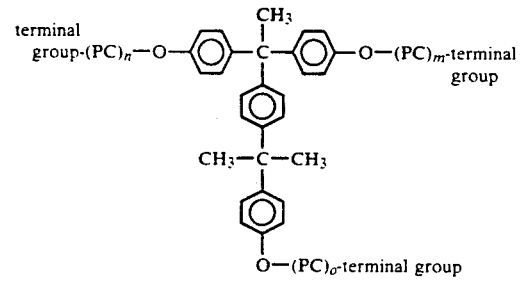

and (c) phloroglucinol of the formula

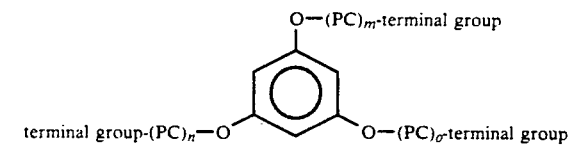

wherein o, m and n are integers and PC is a polycarbonate chain, said polycarbonate having a viscosity average molecular weight of 15,000 to 40,000, and an acetone-soluble matter of not more than 3.5% by weight.

2. The branched polycarbonate of claim 1 wherein is derived form α,α′,α″-tris(4-hydroxyphenyl)-1,3,5-triisopropylbenzene of the formula

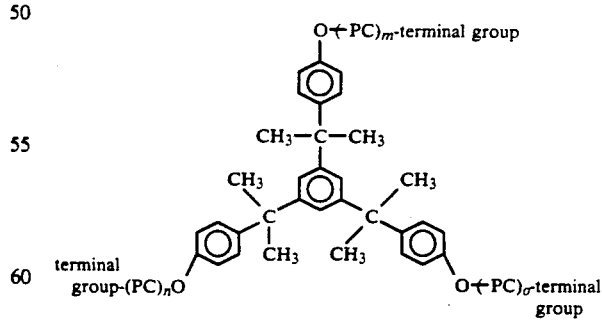

wherein m, n and o are integers and PC is a polycarbonate chain.

3. The branched polycarbonate of claim 1 which is derived from 1-{α-methyl-α-(4′-hydroxyphenyl)-ethyl}-4-{α′,α′-bis(4″-hydroxyphenyl)ethyl}benzene of the formula

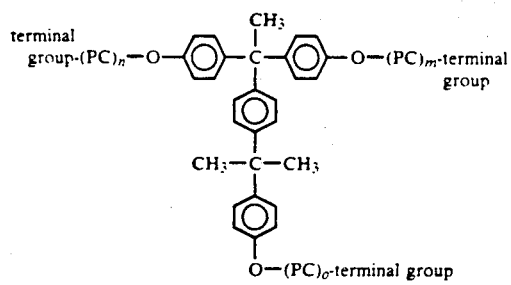

wherein m, n and o are integers and PC is a polycarbonate chain.

4. The branched polycarbonate of claim 1 which is derived form phloroglucinol of the formula

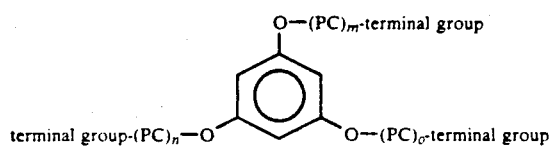

wherein m, n, o are integers and PC is a polycarbonate chain.

5. The branched polycarbonate of claim 2 prepared from (i) bisphenol A to form a polycarbonate chain and (ii) p-cumylphenol or p-tert-octylphenol as a terminal stopper.

6. The branched polycarbonate of claim 3 prepared from (i) bisphenol A to form a polycarbonate chain and (ii) p-cumylphenol or p-tert-octylphenol as a terminal stopper.

7. The branched polycarbonate of claim 4 prepared from (i) bisphenol A to form a polycarbonate chain and (ii) p-cumylphenol or p-tert-octylphenol as a terminal stopper.

8. A process for producing a branched polycarbonate comprising reacting a reaction mixture comprising (i) a polycarbonate oligomer derived from at least one aromatic dihydric phenol, at least one compound having at least three functional groups, and phosgene, (ii) at least one aromatic dihydric phenol, and (iii) a terminal stopper, while stirring the reaction mixture in turbulent flow, and at the point that the viscosity of the reaction mixture increases, an aqueous alkali solution is added and at the same time, the reaction mixture is reacted in laminar flow.

9. A process for producing a branched polycarbonate comprising reacting a reaction mixture comprising (i) a polycarbonate oligomer derived from at least one aromatic dihydric phenol and phosgene, (ii) at least one aromatic dihydric phenol, (iii) at lest one compound having at least three functional groups, and (iv) a terminal stopper, while stirring the reaction mixture in turbulent flow, and at the point that the viscosity of the reaction mixture increases, an aqueous alkali solution is added and at the same time, the reaction mixture is reacted in laminar flow.

10. The process of claim 8, wherein said at least one compound having at least three functional groups is selected form the group consisting of phloroglycine, 4,6-dimethyl-2,4,6-tri(4'-hydroxyphenyl)-heptene-2; 4,6-dimethyl-2,4,6-tri(4'-hydroxyphenyl)-heptane-2; 1,3,5-tri-(4'-hydroxyphenyl)-benzene; 1,1,1-tri(4'-hydroxyphenyl)-ethane; 2,2-bis{4,4-bis(4'-hydroxyphenyl)cyclohexyl}-propane; 2,6-bis(2'-hydroxy-5'-methylbenzyl)-4-methylphenol; 2,6-bis(2'-hydroxy-5'-isopropylbenzyl)-4-isopropylphenol; bis{2-hydroxy-3-(2'-hydroxy-5'-methylbenzyl)-5-methylphenyl}-methane; tetra(4-hydroxyphenyl)methane; tri(4-hydroxyphenyl)phenylmethane; tris(4'-hydroxyaryl)-amyl-s-triazine; α,α',α"-tris(4-hydroxyphenyl)-1,3,5-triisopropylbenzene; 1-{α-methyl-α-(4'-hydroxyphenyl)ethyl}benzene and 1-{α-methyl-α-(4'-hydroxyphenyl)ethyl}-3-(α',α'-bis(4"-hydroxyphenyl)ethyl}-benzene.

11. The process of claim 8, wherein said at least one dihydric phenol is selected from the group consisting bisphenol A; 1,1-bis(4-hydroxyphenyl)ethane; 1,1-bis(4-hydroxyphenyl)butane; 1,1-bis(4-hydroxyphenyl)isobutane; 1,1-bis(4-hydroxyphenyl)cyclohexane; 2,2-bis(4-hydroxyphenyl)propane; and 2,2-bis(4-hydroxyphenyl)butane.

12. The process of claim 10, wherein said at least one dihydric phenol is selected form the group consisting bisphenol A; 1,1-bis(4-hydroxyphenyl)ethane; 1,1-bis(4-hydroxyphenyl)butane; 1,1-bis(4-hydroxyphenyl)isobutane; 1,1-bis(4-hydroxyphenyl)cyclohexane; 2,2-bis(4-hydroxyphenyl)propane; and 2,2-bis(4-hydroxyphenyl)butane.

13. The process of claim 8, wherein said terminal stopper is selected from the group consisting of p-tert-butylphenol, phenol, p-cumylphenol and p-tert-octylphenol.

14. The process of claim 12, wherein said terminal stopper is selected from the group consisting of p-cumylphenol and p-tert-octylphenol.

15. The process of claim 9, wherein said at least one compound having at least three functional groups is selected from the group consisting of phloroglycine, 4,6-dimethyl-2,4,6-tri(4'-hydroxyphenyl)-heptene-2; 4,6-dimethyl-2,4,6-tri(4'-hydroxyphenyl)-heptane-2; 1,3,5-tri-(4'-hydroxyphenyl)-benzene; 1,1,1-tri(4'-hydroxyphenyl)-ethane; 2,2-bis{4,4-bis(4'-hydroxyphenyl)cyclohexyl}-propane; 2,6-bis(2'-hydroxy-5'-methylbenzyl)-4-methylphenol; 2,6-bis(2'-hydroxy-5'-isopropylbenzyl)-4-isopropylphenol; bis{2-hydroxy-3-(2'-hydroxy-5'-methylbenzyl)-5-methylphenyl}-methane; tetra(4-hydroxyphenyl)methane; tri(4-hydroxyphenyl)phenylmethane; tris(4'-hydroxyaryl)-amyl-s-triazine; α,α',α"-tris(4-hydroxyphenyl)-1,3,5-triisopropylbenzene; 1-{α-methyl-α-(4'-hydroxyphenyl)ethyl}benzene and 1-{α-methyl-α-(4'-hydroxyphenyl)ethyl}-3-(α',α'-bis(4"-hydroxyphenyl)ethyl}-benzene.

16. The process of claim 9, wherein said at least one dihydric phenol is selected form the group consisting bisphenol A; 1,1-bis(4-hydroxyphenyl)ethane; 1,1-bis(4-hydroxyphenyl)butane; 1,1-bis(4-hydroxyphenyl)isobutane; 1,1-bis(4-hydroxyphenyl)cyclohexane; 2,2-bis(4-hydroxyphenyl)propane; and 2,2-bis(4-hydroxyphenyl)butane.

17. The process of claim 15, wherein said at least one dihydric phenol is selected from the group consisting bisphenol A; 1,1-bis(4-hydroxyphenyl)ethane; 1,1-bis(4-hydroxyphenyl)butane; 1,1-bis(4-hydroxyphenyl)isobutane; 1,1-bis(4-hydroxyphenyl)cyclohexane; 2,2-bis(4-hydroxyphenyl)propane; and 2,2-bis(4-hydroxyphenyl)butane.

18. The process of claim 9, wherein said terminal stopper is selected from the group consisting of p-tert-butylphenol, phenol, p-cumylphenol and p-tert-octylphenol.

19. The process of claim 17, wherein said terminal stopper is selected from the group consisting of p-cumylphenol and p-tert-octylphenol.

* * * * *